(12) United States Patent
Hsu et al.

(10) Patent No.: US 9,478,139 B2
(45) Date of Patent: Oct. 25, 2016

(54) DRIVING SAFETY SYSTEM AND BARRIER SCREENING METHOD THEREOF

(71) Applicant: Automotive Research & Testing Center, Changhua Hsien (TW)

(72) Inventors: Ping-Min Hsu, Changhua Hsien (TW); Ming-Hung Li, Changhua Hsien (TW)

(73) Assignee: Automotive Research & Testing Center, Changhua Hsein (TW)

( * ) Notice: Subject to any disclaimer, the term of this patent is extended or adjusted under 35 U.S.C. 154(b) by 0 days.

(21) Appl. No.: 14/583,134

(22) Filed: Dec. 25, 2014

(65) Prior Publication Data

US 2016/0189547 A1    Jun. 30, 2016

(51) Int. Cl.
    *G01C 21/00*     (2006.01)
    *G08G 1/16*     (2006.01)
    *B60T 7/12*     (2006.01)

(52) U.S. Cl.
CPC ............. *G08G 1/167* (2013.01); *B60T 7/12* (2013.01); *G08G 1/166* (2013.01)

(58) Field of Classification Search
CPC ............ B60R 2300/8086; B60R 16/037; B60R 16/0373; B60R 21/34; B60R 25/00; B60R 25/1004; B60R 16/03; B60R 2025/1013; B60R 2300/307; B60R 2300/8093; B60R 2325/304; B60R 25/018; B60R 25/102
USPC ....... 701/431, 301, 302, 32.2, 428, 437, 448, 701/116; 340/937, 4.37, 4.4
See application file for complete search history.

(56) References Cited

U.S. PATENT DOCUMENTS

| | | | | |
|---|---|---|---|---|
| 6,246,933 B1 * | 6/2001 | Bague | ............. | G07C 5/085 340/438 |
| 8,676,427 B1 * | 3/2014 | Ferguson | ............. | B60W 30/00 701/23 |
| 2011/0304447 A1 * | 12/2011 | Marumoto | ............. | G07C 5/085 340/438 |

FOREIGN PATENT DOCUMENTS

| | | | |
|---|---|---|---|
| TW | 200920627 | * | 5/2009 |
| TW | I318604 B | | 12/2009 |

* cited by examiner

*Primary Examiner* — Muhammad Shafi
(74) *Attorney, Agent, or Firm* — Alan D. Kamrath; Kamrath IP Lawfirm, P.A.

(57) ABSTRACT

A driving safety system mounted in a vehicle includes an image acquisition module and a distance detection module connected to a vehicle-mounted computer and respectively acquiring at least one piece of barrier information and at least one frame of image information. The vehicle-mounted computer analyzes the barrier information and the image information, constantly receives barrier information in the course of driving, and performs a screen and analysis algorithm to screen out noise from the surrounding environment and a comparison analysis algorithm to eliminate noise reflected from objects on the ground, to accurately acquire front target information. Accordingly, the driving safety system can correctly determine barriers in the front when the vehicle is moving to achieve the goal of enhancing driving safety.

19 Claims, 9 Drawing Sheets

DRIVING SAFETY SYSTEM AND BARRIER SCREENING METHOD THEREOF

BACKGROUND OF THE INVENTION

1. Field of the Invention

The present invention relates to a driving safety system and, more particularly, to a driving safety system and a barrier screening method.

2. Description of the Related Art

To keep abreast with technological progress, developing a smart driving system has gradually become a trend in the smart car market. Current smart driving systems identify a relationship between the driver's habitual safety distance and a car speed with information, such as car speed, distance behind a vehicle and the like, analyzed by a neural network for the driver's driving habits, such that the safe distance is configurable depending on the car speed. The stability of those smart driving systems is in turn closely bound up to failure of the smart driving systems. Besides, those driving systems are prone to influence of complicated environment or noise, which can lead to errors in detecting a front target vehicle, especially in a turning operation, and result in issues of system malfunction and lower system effectiveness.

Current driving systems, such as Volvo's City Safety system, operate when the vehicle is within a speed range 1530 km/h. When the system detects a front barrier, the City Safety system will slow down and then fully stops the vehicle if its speed is under 15 km/h. One of the current driving systems, Mazda's SCBS system, employs a laser detector to capture information of a barrier in the front and detects a distance to the barrier in order to determine whether the host car desires a braking control to decelerate the vehicle and lower the chance of collision or not when the car speed is within a range 4~30 km/h. Ford has introduced a collision avoidance system as an essential safety system equipped in many models thereof, which begins active brake control when the car speed is within 5~30 km/h and a detected distance to a front barrier is less than an alert value. It is applicable to a curved road with the radius of a curvature greater than 20 m.

As disclosed in Taiwan Patent No. I318604, entitled "Method for estimating time to collision using recursive least square algorithm", the method targets at enhancing accuracy in calculating a time to collision, and adopts a distance detector mounted on a vehicle to measure a relative distance between the vehicle and an external vehicle or a barrier. An estimation unit mounted on the vehicle reads the relative distance measured by the distance detector, and it calculates a curve of a second order with the relative distance using the recursive least square (RLS) method to substitute multiple known parameters into equations associated with the curve and the RLS method for obtaining a time point when the relative distance is zero and for estimating time to collision and a time difference therebetween. Thus, despite noise interference, the negative effect of noise can be mitigated to avoid the chance of collision.

Given the foregoing smart driving systems and method, the vehicle speed can be decelerated, the chance of collision can be lowered, while the following drawbacks fail to be ruled out.

1. Vehicles have to be driven at a speed under 30 km/h, and the application is only applicable to certain driving circumstances with the conventional smart driving systems.

2. A braking timing or an advance alert fails to be accurately determined or provided to result in a slower vehicle speed in an attempt to prevent a late braking control.

3. Current techniques lack a prediction mechanism and enough accuracy and thus lead to unstable systems and accidents arising from frequent troubles in the systems.

Moreover, to increase the accuracy of the systems in determining a barrier, conventional techniques estimate the time to collision and the time difference with complicated equations to lessen the noise effect and avoid the occurrence of collision. However, lots of time and computational resources are required, and situations to be screened out are mostly involved in those having a floating relative distance between the vehicle with the driving system and an external vehicle or a barrier, because no determination is made whether a target in the front actually exists and whether the target in the front is directly assumed to be an actually existing entity.

SUMMARY OF THE INVENTION

An objective of the present invention is to provide a driving safety system and a barrier-screening method thereof using a driving safety system mounted in a vehicle to accurately determine and eliminate noises generated from non-barriers, surrounding environment and the ground beforehand without being subjected to the limitations of driving speed and driving occasions, thereby enhancing accuracy and stability of the driving safety system in barrier determination.

To achieve the foregoing objective, the barrier screening method of a driving safety system is performed by a vehicle-mounted computer that is connected to an image acquisition module and a distance detection module, and the barrier screening method has the steps of:

receiving at least one piece of barrier information from at least one barrier and at least one frame of image information, with each frame of image information containing the at least one barrier;

performing a screen and analysis algorithm to process each one of the at least one piece of barrier information to generate location information of a corresponding barrier; and comparing location information of the corresponding barrier to eliminate a noise reflected from the ground and to obtain front target information.

To achieve the foregoing objective, the driving safety system has a distance detection module, an image acquisition module and a vehicle-mounted computer.

The distance detection module acquires at least one piece of barrier information from at least one barrier.

The image acquisition module acquires at least one frame of image information, with each frame of image information containing the at least one barrier.

The vehicle-mounted computer is connected to the distance detection module and the image acquisition module, receives the at least one piece of barrier information and the at least one frame of image information, performs a screen and analysis algorithm to screen out noise coming from any non-barrier and reflected from a surrounding environment, generating location information of the at least one barrier after screening the noise, and comparing the location information of the at least one barrier with the at least one frame of image information to eliminate noise generated from objects on the ground and to acquire front target information.

From the foregoing method and system, the driving safety system is mounted in a vehicle for operation. The distance detection module receives the barrier information, and the image acquisition module receives the image information corresponding to the barrier information. The vehicle-mounted computer performs the screen and analysis algorithm to process the barrier information to screen out noise reflected from the surrounding environment, and generates location information of any suspected barrier to instantly acquire front target information. Accordingly, the driving safety system and the barrier screening method can accurately determine and eliminate noises generated from non-barriers, surrounding environment and the ground beforehand without being subjected to the limitations of driving speed and driving occasions, thereby enhancing accuracy and stability of the driving safety system and the barrier screening method in barrier determination.

Other objectives, advantages and novel features of the invention will become more apparent from the following detailed description when taken in conjunction with the accompanying drawings.

DETAILED DESCRIPTION OF THE INVENTION

Figure 1:
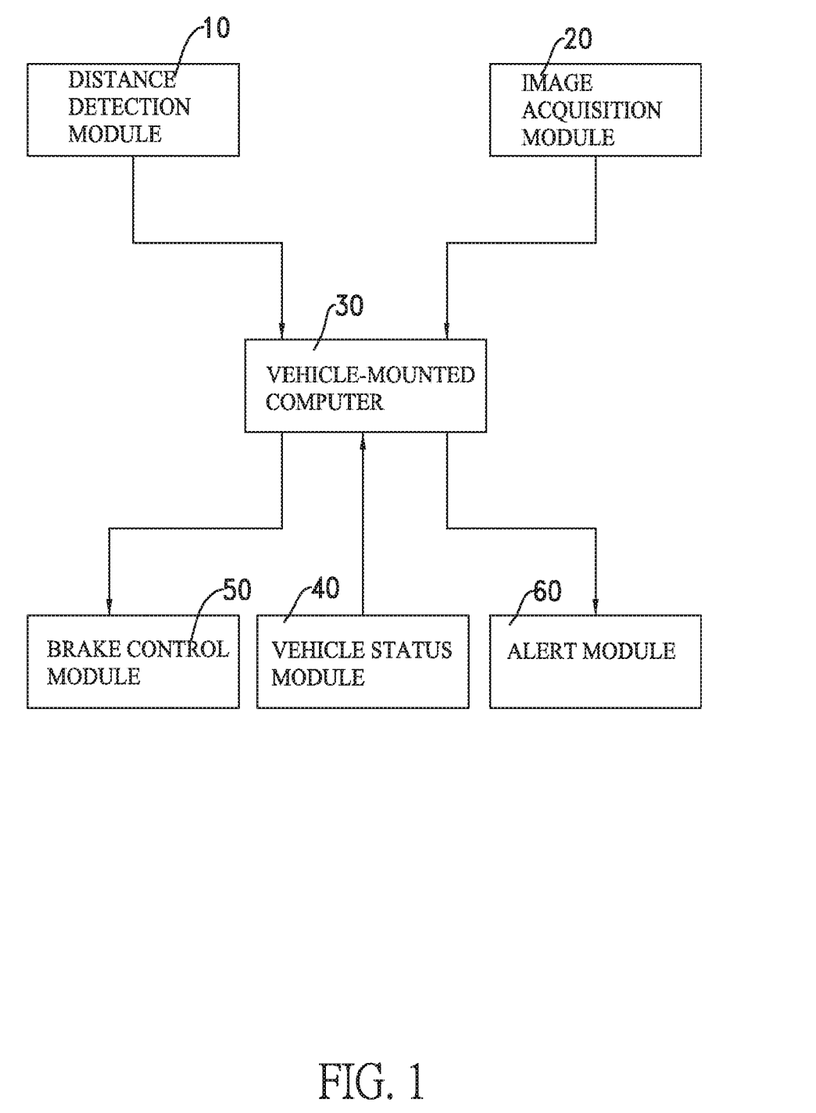
FIG. 1 is a functional block diagram of a driving safety system in accordance with the present invention.
Figure 2:
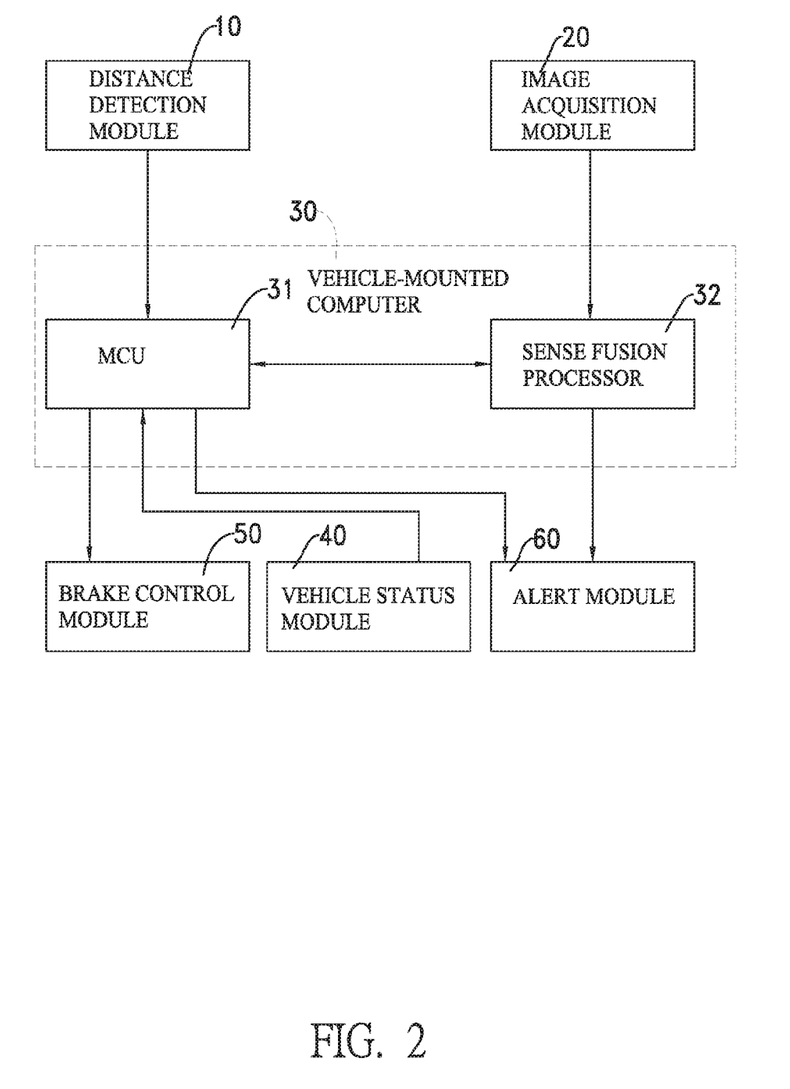
FIG. 2 is another functional block diagram of the driving safety system in FIG. 1.

With reference to FIGS. 1 and 2, a driving safety system in accordance with the present invention has a distance detection module 10, an image acquisition module 20, a vehicle-mounted computer 30, a brake control module 50, a vehicle status module 40 and an alert module 60. The vehicle-mounted computer 30 is connected to the distance detection module 10, the image acquisition module 20, the brake control module 50, the vehicle status module 40 and the alert module 60.

The distance detection module 10 acquires at least one piece of barrier information from at least one barrier and transmits the at least one piece of barrier information to the vehicle-mounted computer 30. The image acquisition module 20 acquires at least one frame of image information, with each frame of image information containing the at least one barrier, and transmits the at least one frame of image information to the vehicle-mounted computer 30 for the vehicle-mounted computer 30 to perform analysis. In the present embodiment, the distance detection module 10 is a millimeter wave radar, the image acquisition module 20 is a camera, and the alert module 60 includes a display unit and/or an audible unit. The display unit allows instant information and alert information to be displayed thereon. The audible unit serves to produce an alarm sound.

The vehicle-mounted computer 30 performs a screen and analysis algorithm to process the at least one piece of barrier information and the at least one frame of image information to screen out noises coming from non-barriers and reflected from a surrounding environment, and generates location information of the at least one barrier after screening noise from the at least one piece of barrier information. The vehicle-mounted computer 30 compares the location information of the at least one barrier with the at least one frame of image information to eliminate noise generated from other objects on the ground and to thus acquire actual front target information. When the driving safety system is mounted in a vehicle, the vehicle-mounted computer 30 can instantly determine a traffic condition in the front, provides an early alert, and stabilizes the driving safety system. Furthermore, because noise reflected by objects in the surrounding environment and on the ground and noise reflected from non-barrier can be accurately determined and removed, the accuracy and stability of the driving safety system in barrier determination can be enhanced to ensure higher driving safety.

The brake control module 50 receives a brake activation/brake fluid cutoff signal from the vehicle-mounted computer 30 according to a determined analysis result done by the vehicle-mounted computer 30 to slow down the vehicle.

The vehicle status module 40 serves to detect a current driving status of the vehicle and to provide driving status information to the vehicle-mounted computer 30 for the vehicle-mounted computer 30 to use the driving status information in other analysis and application. In the present embodiment, the driving status information includes a vehicle speed signal and an angular speed signal. When the vehicle-mounted computer 30 determines a vehicle moving path according to the at least one frame of image information acquired by the image acquisition module 20, the at least one piece of barrier information acquired by the distance detection module 10 and the driving status information returned from the vehicle status module 40, if the front target information falls within a warning range, the vehicle-mounted computer 30 then sends the brake activation/brake fluid cutoff signal to the brake control module 50 to slow down the vehicle.

When performing calculations with the driving status information acquired from the vehicle status module 40 and the at least one piece of barrier information from the distance detection module 10, the vehicle-mounted computer 30 obtains a barrier speed of each one of the at least one barrier. When the barrier speed exceeds a speed threshold, the barrier is determined as a dynamic barrier. Otherwise, the barrier is determined as a static barrier.

In the present embodiment, the vehicle-mounted computer is composed of a microcontroller unit (MCU) 31 and a sense fusion processor 32 in connection with the MCU 31. With reference to FIG. 2, the MCU 31 is electrically connected to the distance detection module 10, the brake control module 50, the vehicle status module 40 and the alert module 60. The sense fusion processor 32 is electrically connected to the image acquisition module 20 and the alert module 60. In the present embodiment, the sense fusion processor 32 is a digital signal processor. The sense fusion processor 32 speeds up computation and acquisition of the front target information, identifies one of the at least one piece of barrier information most adjacent to the vehicle moving path through the at least one piece of barrier information and the at least one frame of image information, and determines if the barrier having the identified piece of barrier information is a static barrier. If the determination result is positive, the sense fusion processor 32 further performs vehicle recognition according to the location information of the identified piece of barrier information to ascertain if the front target information is associated with a vehicle and displays a determination result with an alert pattern marked thereon through the alert module 60.

When the driving safety system is applied to a screen barrier during the course of vehicle movement, the vehicle-mounted computer 30 receives the at least one piece of barrier information and the at least one frame of image information corresponding to the at least one barrier information through the distance detection module 10 and the image acquisition module 20. However, due to a mirror effect generated by a surrounding environment, the image acquisition module 20 may incorrectly determine a barrier existence in the distance because of signal reflection, and the resulting noise appears to be drifting. In the present embodiment, the screen and analysis algorithm further includes a first noise-screening method and a second noise-screening method to screen out noises reflected from the surrounding environment and coming from the non-barriers in a bi-fold and thorough manner.

Figure 3:
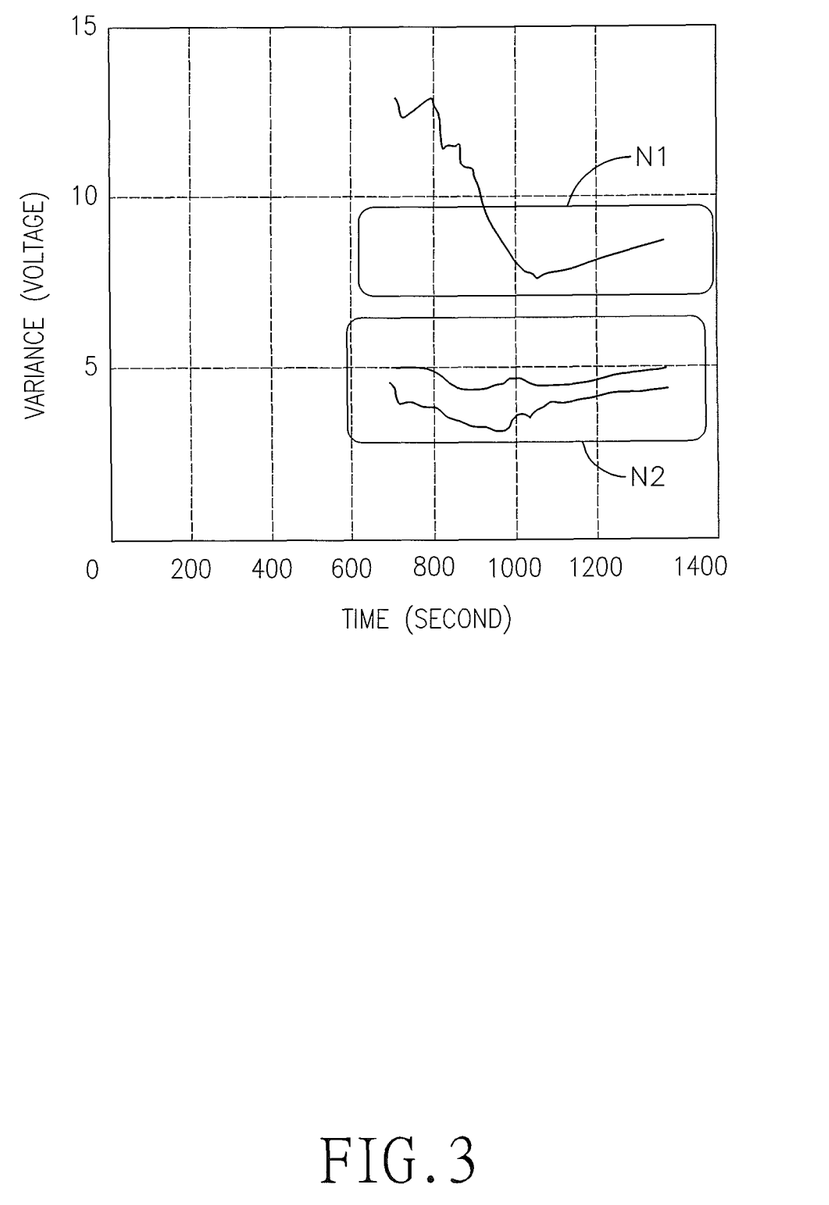
FIG. 3 is a waveform diagram illustrating one approach of screening noise arising from a mirror effect in a driving environment.

The first noise-screening method collects all received signals for statistical analysis. With reference to FIG. 3, a coordinated graph with a horizontal axis (time; unit: second) and a vertical axis (variance; unit: voltage) is shown. The vehicle-mounted computer 30 calculates distance information and estimated distance information of each one of the at least one barrier and a variance of an error of difference between the distance information and the estimated distance information of the barrier, and resets the variance to zero and then calculates the variance again every other period of time, such as 6.4 seconds. As the noise arising from mirror effect fluctuates significantly, such noise is characterized in having a variance fluctuating with variation in variance value outside a fluctuation range. When the variance of a signal is determined to be in a fluctuating state in compliance with the foregoing characteristic, the signal is determined to be a noise N1. Otherwise, the signal is determined as a normal signal N2. In the present embodiment, the variance calculation involves a calculation of standard deviation.

Figure 4:
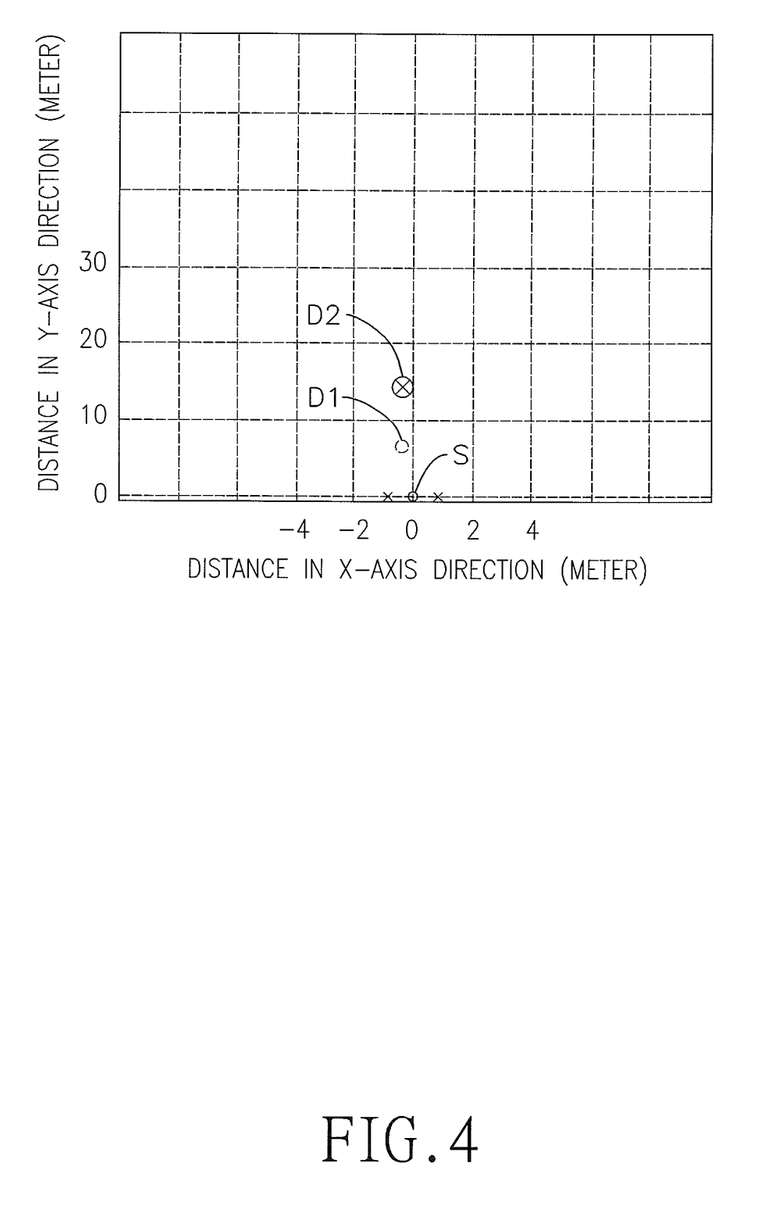
FIG. 4 is a coordinate diagram illustrating another approach of screening noise caused by second harmonic generation from a barrier.

After the noise generated from a mirror effect is screened out by the first noise-screening method, if the front target information is available and if the signal of the front target is reflected back and forth between the front target and the vehicle, the signal will travel a distance doubling the distance between the front target and the vehicle. The second noise-screening method serves to eliminate the noise due to a second order harmonic wave generated from the signal reflected between the front target and the vehicle. With reference to FIG. 4, a coordinate graph with a horizontal axis, a vertical axis, the location information D1 of a first barrier and the location information D2 of a second barrier is shown. The horizontal coordinate represents a distance (meter) in an X-axis direction to the vehicle S centered at an origin, and the vertical coordinate represents a distance (meter) in a Y-axis direction to the vehicle S. When acquiring the location information D1 of the first barrier and the location information D2 of the second barrier and determining that a ratio of a distance between the location information D2 of the second barrier and the vehicle S over a distance between the location information D1 of the first barrier to the vehicle S meets a preset value, for example, the distance from the location information D2 of the second barrier to the vehicle doubling a distance from the location information D1 of the first barrier to the vehicle, the vehicle-mounted computer 30 further determines if the location information (X coordinate and Y coordinate) of the first barrier and the second barrier falls within a distance range. If the determination result is positive, the location information D2 of the second barrier is from noise caused by the second order harmonic wave. Moreover, the distance range for determining noise generation can be calculated according to standard deviation of the location information of the first barrier.

Figure 5:
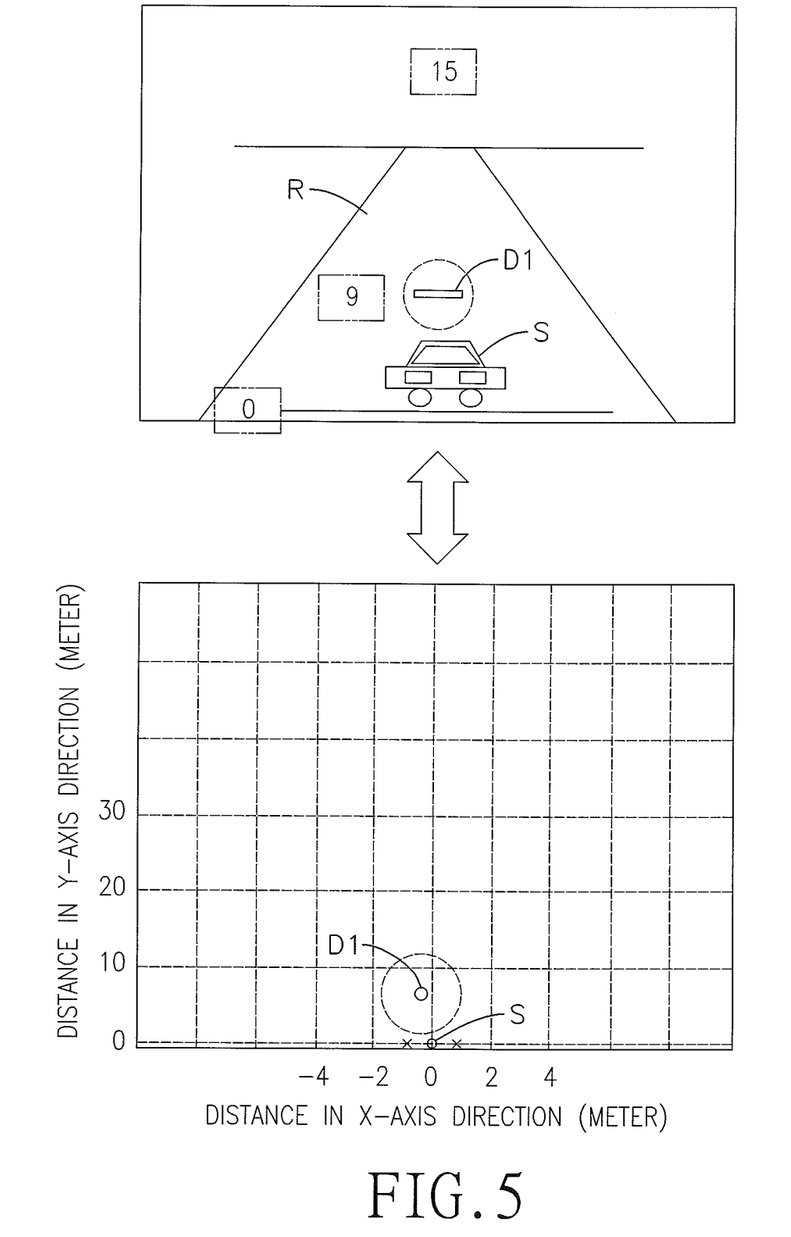
FIG. 5 is a schematic diagram in combination with a coordinate diagram for illustrating an approach of screening noise reflected from the ground.

After the vehicle-mounted computer 30 performs the first noise-screening method and the second noise-screening method, the location information of a barrier is generated according to the location information of the first barrier. However, this location information may be generated by a signal reflected from an object, such as a metal object, on the ground. Therefore, the vehicle-mounted computer 30 needs to further compare the location information with the at least one frame of image information for executing a ground noise screening method. With reference to FIG. 5, a vehicle moving path range R, the vehicle S and the location information D1 of the first barrier are shown. The distance detection module 10 acquires a distance in the Y-axis direction between the location information D1 of the first barrier and the vehicle S, which is taken as a first distance (e.g. 9 m). The image acquisition module 20 acquires a distance between the location information D1 of the first barrier and the vehicle S in the Y-axis direction, which is taken as a second distance (e.g. 15 m). When determining that the first distance differs from the second distance or a difference between the second distance and the first distance is greater than a configured value, the vehicle-mounted computer 30 determines that the location information D1 of the first barrier is from a ground-reflected noise and performs the ground noise screening method. The ground noise screening method is performed by the distance detection module 10 to lock the location information of the first barrier as a target, to keep track of the location information of the first barrier in generation of estimated location information (X coordinate and Y coordinate), to compare the estimated location information with the location information D1 of the first barrier subsequently acquired to obtain an absolute value, and to determine that the signal generated by the first barrier is noise if the absolute value is less than an error threshold, such that the noise generated by the first barrier can be screened out. Hence, noises generated from ground reflection can be continuously removed to attain the purpose of accurately acquiring front target information.

Figure 6:
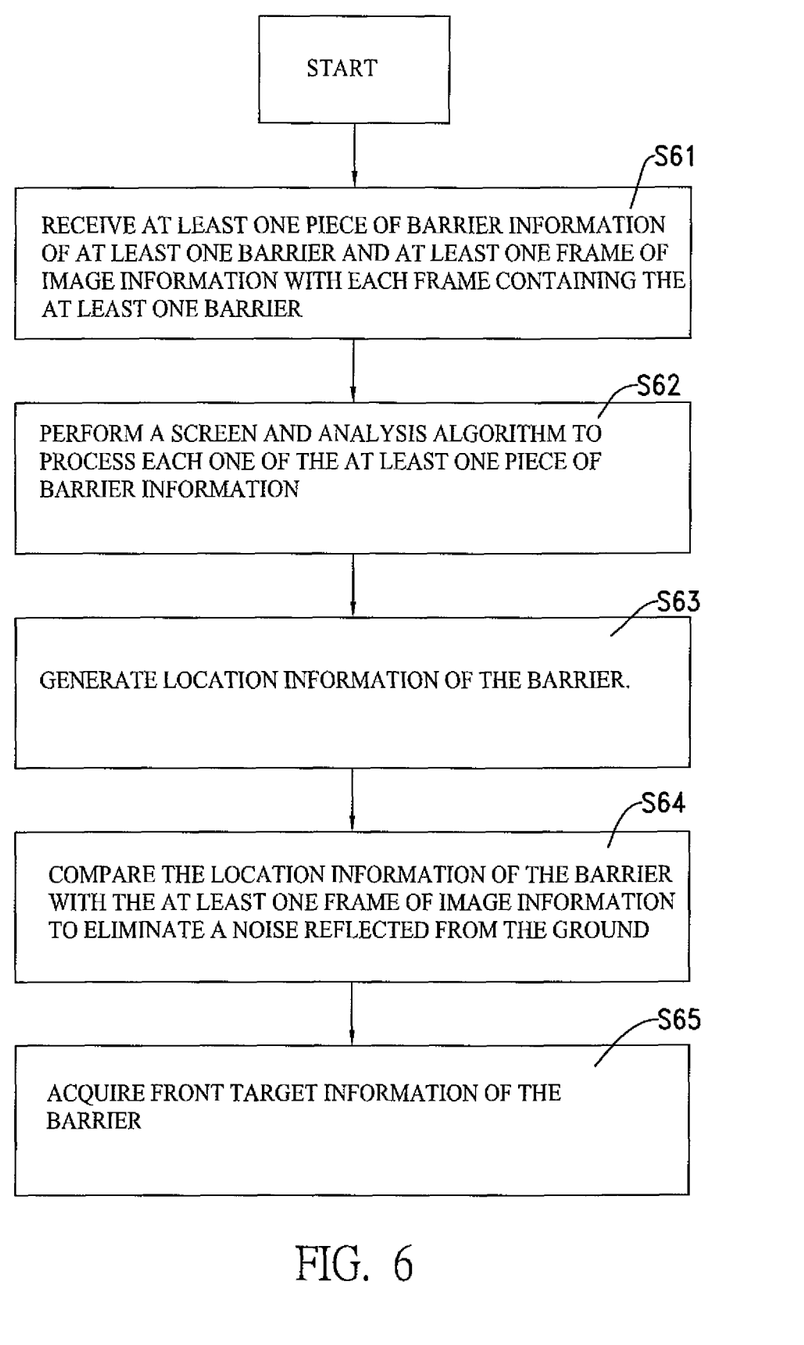
FIG. 6 is a flow diagram of a barrier screening method in accordance with the present invention.

Given the description and application of the foregoing embodiment, a barrier-screening method of a driving safety system can be concluded as follows. The barrier-screening method is performed by the vehicle-mounted computer 30 that is connected to the image acquisition module 20 and the distance detection module 10. With reference to FIG. 6, the barrier-screening method has the following steps.

Step S61: Receive at least one piece of barrier information of at least one barrier and at least one frame of image information with each frame containing the at least one barrier.

Step S62: Perform a screen and analysis algorithm to process each one of the at least one piece of barrier information to generate location information associated with the piece of barrier information.

Step S63: Generate location information of the barrier.

Step S64: Compare the location information of the barrier with the at least one frame of image information to eliminate noise reflected from the ground.

Step S65: Acquire front target information of the barrier.

In the present embodiment, the vehicle-mounted computer acquires the driving status information and the at least one piece of barrier information through the vehicle status module 40 and the distance detection module 10, and calculates a barrier speed of each one of the at least one barrier with the driving status information and the at least one piece of barrier information. When the barrier speed exceeds a speed threshold, the barrier is determined as a dynamic barrier. Otherwise, the barrier is determined as a static barrier.

Given the vehicle-mounted computer 30, the image acquisition module 20 and the distance detection module 10 are mounted in a vehicle, the vehicle-mounted computer 30 receives the at least one piece of barrier information through the distance detection module 10 and the at least one frame of image information with each frame containing the at least one barrier through the image acquisition module 20, and performs the screen and analysis algorithm to process the at least one piece of barrier information to screen out noise reflected from the surrounding environment and generating location information of any suspected barrier. When step S62 is carried out, with reference to FIG. 7, the vehicle-mounted computer 30 further performs a first noise-screening method. The first noise-screening method has the following steps.

Figure 7:
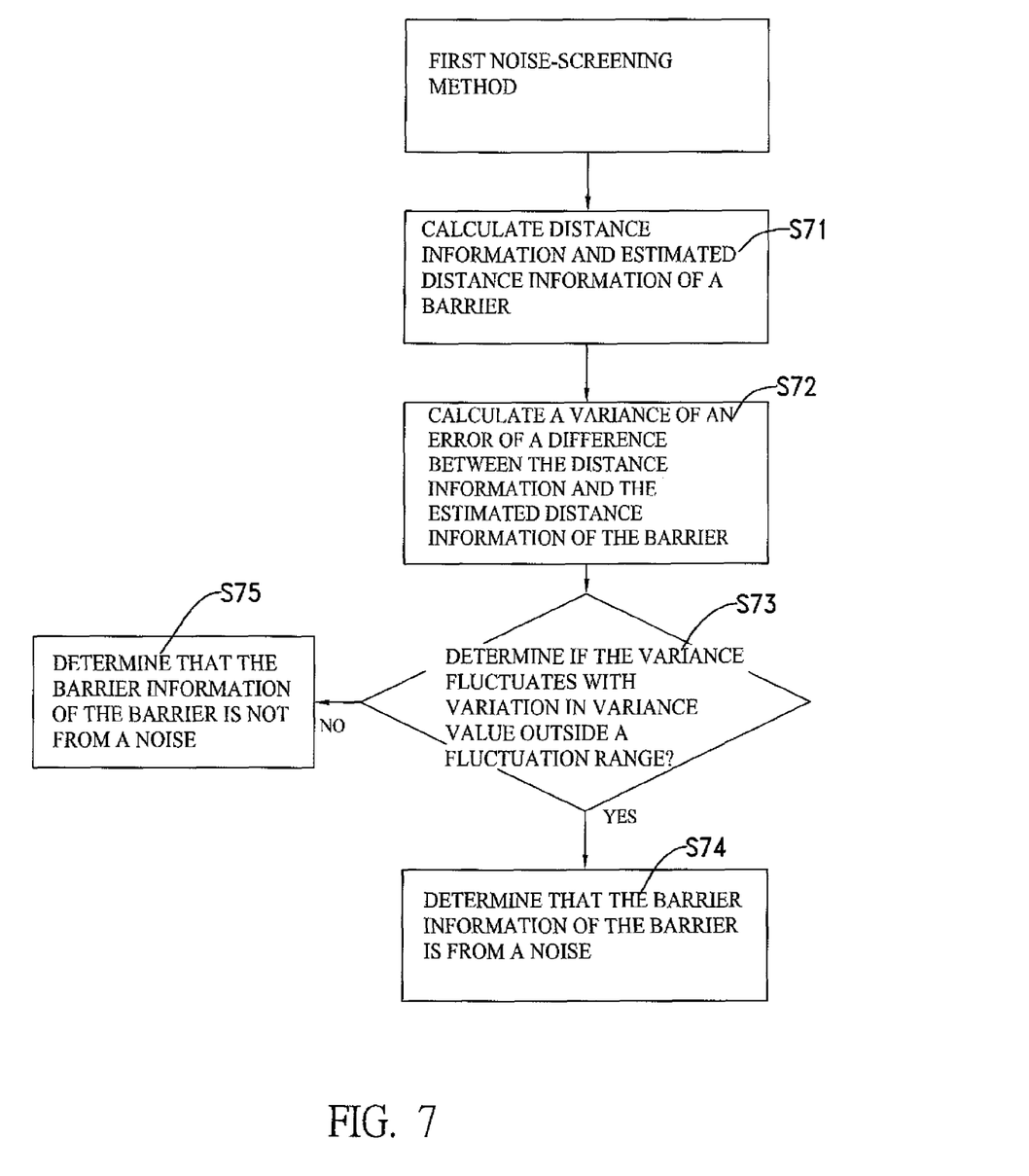
FIG. 7 is a flow diagram of a first noise screening method for screening noise caused by a mirror effect in a driving environment.

Step S71: Calculate distance information and estimated distance information of a barrier.

Step S72: Calculate a variance of an error of a difference between the distance information and the estimated distance information of the barrier.

Step S73: Determine if the variance fluctuates with variation in variance value outside a fluctuation range. If the determination result is positive, perform step S74. Otherwise, perform step S75.

Step S74: Determine that the barrier information of the barrier is from noise.

Step S75: Determine that the barrier information of the barrier is not from noise.

Figure 8:
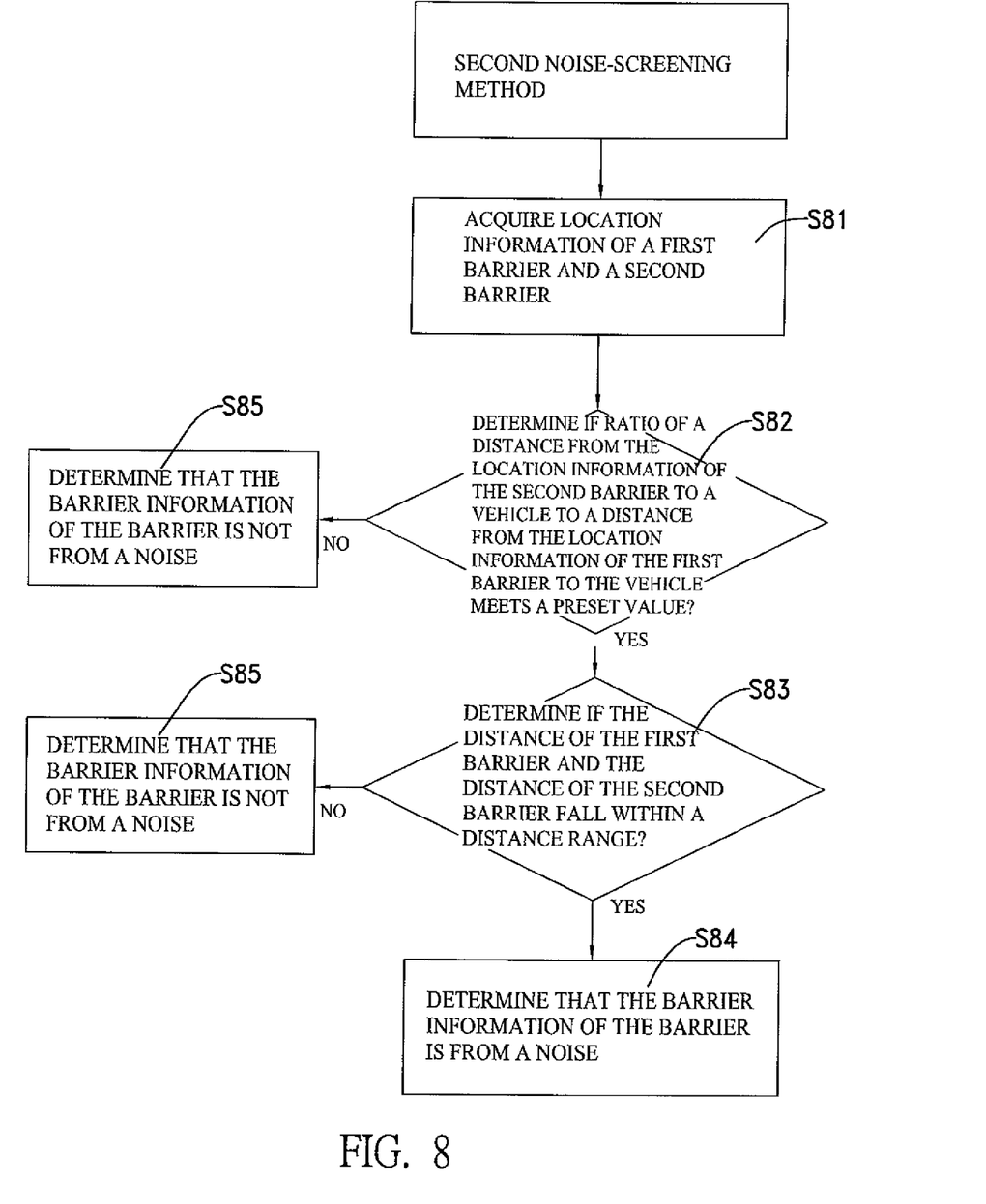
FIG. 8 is a flow diagram of a second noise screening method for screening noise caused by second harmonic generation from a barrier.

When step S62 is carried out, with reference to FIG. 8, the vehicle-mounted computer 30 further performs a second noise-screening method. The second noise-screening method has the following steps.

Step S81: Acquire location information of a first barrier and a second barrier.

Step S82: Determine if a ratio of a distance from the location information of the second barrier to a vehicle to a distance from the location information of the first barrier to the vehicle meets a preset value. If the determination result is positive, perform step S83. Otherwise, perform step S85.

Step S83: Determine if the distance of the first barrier and the distance of the second barrier fall within a distance range. If the determination result is positive, perform step S84. Otherwise, perform step S85.

Step S84: Determine that the location information of the second barrier is from noise caused by second harmonic generation from the second barrier.

Step S85: Determine that the location information of the second barrier is not from noise.

Figure 9:
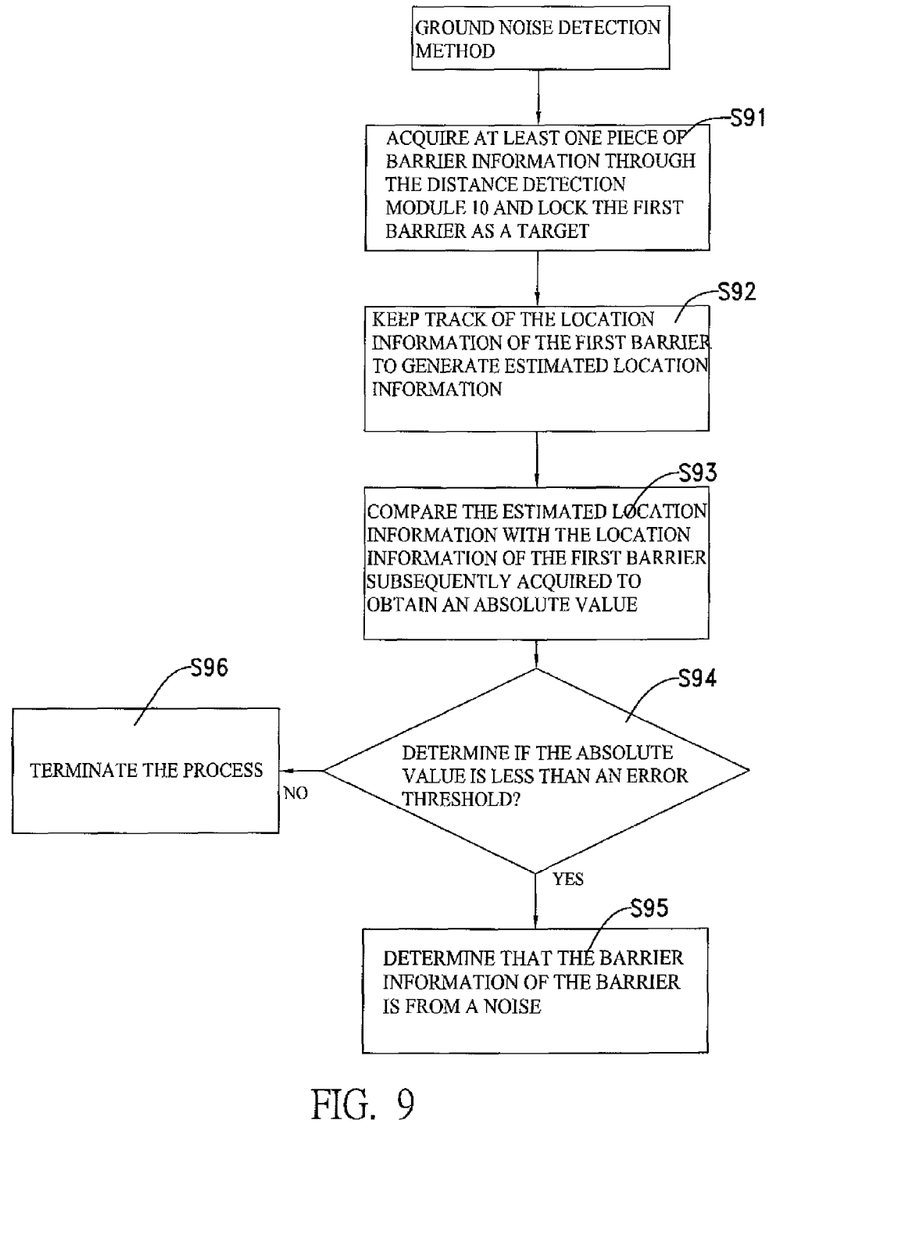
FIG. 9 is a flow diagram of a method for screening noise reflected from the ground.

After carrying out the first noise-screening method and the second noise-screening method, the vehicle-mounted computer 30 compares the location information with the at least one frame of image information to further eliminate noise reflected from the ground, accurately remove all barrier information from non-barrier, and instantly acquire front target information. When the distance of the first barrier differs from the distance of the second barrier or a difference between the distance of the second barrier and the distance of the first barrier is greater than a configured value in step S64, the vehicle-mounted computer 30 performs a ground noise screening method. The ground noise screening method has the following steps.

Step S91: Acquire at least one piece of barrier information through the distance detection module 10 and lock the first barrier as a target. In the present embodiment, the sense fusion processor 32 of the vehicle-mounted computer identifies one of the at least one piece of barrier information most adjacent to the vehicle moving path with the at least one piece of barrier information and the at least one frame of image information, and determines if the identified piece of barrier information is from a static barrier. If the determination result is positive, the sense fusion processor 32 further performs vehicle recognition according to the location information of the identified barrier information to ascertain if the front target information is associated with a vehicle.

Step S92: Keep track of the location information of the first barrier to generate estimated location information.

Step S93: Compare the estimated location information with the location information of the first barrier subsequently acquired to obtain an absolute value.

Step S94: Determine if the absolute value is less than an error threshold and if the determination result is positive, perform step S95. Otherwise, perform Step S96.

Step S95: Determine that the location information of the first barrier is from noise, and the location information of the first barrier can be screened out.

Step S96: Terminate the process.

In sum, the driving safety system in accordance with the present invention can predict a driving status and accurately determine noises caused by a non-barrier and reflection from an object in the surrounding environment and on the ground to prevent causing malfunction of the system in incorrectly determining a target vehicle in the front because of the influence of external noise and roadside barriers. Signal processing is introduced to eliminate noise and thus simplify information associated with the driving environment and lower the failure rate of the system. The technique of the present invention can be integrated into an automatic emergency braking (AEB) system to enhance the accuracy and stability of the driving safety system in barrier determination and achieve the purpose of increasing driving safety.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A barrier screening method comprising:
   mounting a driving safety system in a vehicle, with the driving safety system including a computer, an image acquisition module and a distance detection module, with the computer connected to the image acquisition module and the distance detection module; and
   the computer performing the method comprising:
   receiving at least one piece of barrier information of at least one barrier from the distance detection module and at least one frame of image information from the image acquisition module with each frame of image information containing the at least one barrier;

performing a screen and analysis algorithm to process each one of the at least one piece of barrier information to screen out noise existing in the at least one piece of barrier information coming from any non-barrier and reflected from a surrounding environment;

generating location information of a corresponding barrier after screening out the noise from the at least one piece of barrier information;

comparing the location information of the corresponding barrier with the at least one frame of image information to eliminate the noise generated from objects on the ground and to obtain front target information;

detecting a current driving status of the vehicle by a vehicle status module; and sending a brake activation signal to slow down the vehicle or a brake fluid cutoff signal to a brake control module according to a determined analysis based upon the at least one piece of barrier information of the at least one barrier.

2. The barrier screening method of claim 1, wherein in performing the screen and analysis algorithm, the computer performs a first noise-screening method, with the first noise-screening method comprising:

calculating distance information and estimated distance information of the at least one barrier;

determining when a variance fluctuates with variation in a variance value outside a fluctuation range; and determining that the at least one piece of barrier information of the at least one barrier is from the noise when the variance fluctuates with variation in the variance value outside the fluctuation range.

3. The barrier screening method of claim 2, wherein in performing a screen and analysis algorithm, the computer further performs a second noise-screening method, wherein the at least one barrier comprises a first barrier and a second barrier, wherein the second noise-screening method comprises:

acquiring location information of the first barrier and the second barrier;

determining if a ratio of a distance from the location information of the second barrier to the vehicle to a distance from the location information of the first barrier to the vehicle meets a preset value;

determining when the distance of the first barrier and the distance of the second barrier fall within a distance range when the ratio meets the preset value; and determining that the location information of the second barrier is from the noise caused by a second harmonic generation from the second barrier.

4. The barrier screening method of claim 3, wherein in comparing the location information of the corresponding barrier, the computer performs a ground noise screening method according to a first distance between the location information of the first barrier and the vehicle and a second distance between the location information of the second barrier and the vehicle, wherein the ground noise screening method comprises:

locking the first barrier as a target;

keeping track of the location information of the first barrier to generate estimated location information;

comparing the estimated location information with the location information of the first barrier subsequently acquired to obtain an absolute value;

determining when the absolute value is, less than an error threshold; and determining that the location information of the first barrier is from the noise when the absolute value is less than an error threshold.

5. The barrier screening method of claim 4, with the computer acquiring driving status information and a piece of barrier information and calculating a barrier speed using the driving status information and the piece of barrier information, and when the barrier speed exceeds a speed threshold, the at least one barrier is determined as a dynamic barrier, otherwise, the at least one barrier is determined as a static barrier.

6. The barrier screening method of claim 4, with the computer identifying one of the at least one piece of barrier information most adjacent to a vehicle moving path through the at least one piece of barrier information and the at least one frame of image information and determining when the identified piece of barrier information is from a static barrier, and when the identified piece of barrier information is from the static barrier, the computer further performing vehicle recognition according to the location information of the identified piece of barrier information to ascertain if the front target information is associated with a vehicle.

7. The barrier screening method of claim 5, with the computer identifying one of the at least one piece of barrier information most adjacent to a vehicle moving path through the at least one piece of barrier information and the at least one frame of image information and determining when the identified piece of barrier information is from a static barrier, and when the identified piece of barrier information is from the static barrier, the computer further performing vehicle recognition according to the location information of the identified piece of barrier information to ascertain if the front target information is associated with a vehicle.

8. The barrier screening method of claim 1, with the computer acquiring driving status information and a piece of barrier information and calculating a barrier speed using the driving status information and the piece of barrier information, and when the barrier speed exceeds a speed threshold, the at least one barrier is determined as a dynamic barrier, otherwise, the at least one barrier is determined as a static barrier.

9. The barrier screening method of claim 8, with the computer identifying one of the at least one piece of barrier information most adjacent to a vehicle moving path through the at least one piece of barrier information and the at least one frame of image information and determining when the identified piece of barrier information is from a static barrier, and when the identified piece of barrier information is from the static barrier, the computer further performing vehicle recognition according to the location information of the identified piece of barrier information to ascertain if the front target information is associated with a vehicle.

10. The barrier screening method of claim 1, with the computer identifying one of the at least one piece of barrier information most adjacent to a vehicle moving path through the at least one piece of barrier information and the at least one frame of image information and determining when the identified piece of barrier information is from a static barrier, and when the identified piece of barrier information is from the static barrier, the computer further performing vehicle recognition according to the location information of the identified piece of barrier information to ascertain if the front target information is associated with a vehicle.

11. A driving safety system mounted in a vehicle, comprising:
   a distance detection module configured to acquire at least one piece of barrier information from at least one barrier;
   an image acquisition module configured to acquire at least one frame of image information with each frame of image information containing the at least one barrier; and
   a vehicle-mounted computer connected to the distance detection module and the image acquisition module, configured to receive the at least one piece of barrier information and the at least one frame of image information, configured to perform a screen and analysis algorithm to screen out noise coming from any non-barrier and reflected from a surrounding environment, configured to generate location information of the at least one barrier after screening the noise, and configured to compare the location information of the at least one barrier with the at least one frame of image information to eliminate noise generated from objects on ground and to acquire front target information.

12. The driving safety system of claim 11, further comprising:
   a brake control module configured to receive a brake activation signal or a brake fluid cutoff signal from the vehicle-mounted computer according to a determined analysis result done by the vehicle-mounted computer to slow down the vehicle;
   a vehicle status module configured to detect a current driving status of the vehicle and configured to provide driving status information to the vehicle-mounted computer for the vehicle-mounted computer to use the driving status information in other analysis; and
   an alert module configured to provide instant information or an alarm.

13. The driving safety system of claim 12, wherein the vehicle-mounted computer configured to determine a vehicle moving path according to the at least one frame of image information acquired from the image acquisition module, the at least one piece of barrier information acquired from the distance detection module and the driving status information returned from the vehicle status module, and when the front target information falls within a warning range, the vehicle-mounted computer then configured to send the brake activation signal or the brake fluid cutoff signal to the brake control module to slow down the vehicle.

14. The driving safety system of claim 13, wherein the driving status information includes a vehicle speed signal and an angular speed signal, and with the driving status information and the at least one piece of barrier information, the vehicle-mounted computer configured to obtain a barrier speed of each one of the at least one barrier, and when the barrier speed exceeds a speed threshold, the barrier is determined as a dynamic barrier.

15. The driving safety system of claim 14, wherein the vehicle-mounted computer has:
   a microcontroller unit (MCU) electrically connected to the distance detection module, the brake control module, the vehicle status module and the alert module; and
   a sense fusion processor electrically connected to the MCU, the image acquisition module and the alert module, configured to identify one of the at least one piece of barrier information most adjacent to the vehicle moving path through the at least one piece of barrier information and the at least one frame of image information, configured to determine when the identified piece of barrier information is from a static barrier, and further configured to perform vehicle recognition according to the location information of the identified piece of barrier information to ascertain if the front target information is associated with a vehicle and configured to display a determination result with an alert pattern marked thereon through the alert module when the identified piece of barrier information is from the static barrier.

16. The driving safety system of claim 15, wherein the distance detection module is a millimeter wave radar, and the image acquisition module is a camera.

17. The driving safety system of claim 16, wherein the alert module includes:
   a display unit configured to provide instant information and alert information displayed thereon; and
   an audible unit configured to produce an alarm sound.

18. The driving safety system of claim 11, wherein the distance detection module is a millimeter wave radar, and the image acquisition module is a camera.

19. The driving safety system of claim 18, wherein the alert module includes:
   a display unit configured to provide instant information and alert information displayed thereon; and
   an audible unit configured to produce an alarm sound.

* * * * *